United States Patent Office 3,504,361
Patented Mar. 31, 1970

3,504,361
SHAFT POSITION INDICATING ARRANGEMENT FOR SYNCHROS AND THE LIKE
Michael Catton, Southampton, England, assignor to The Plessey Company Limited, Ilford, England, a British company
Filed Dec. 10, 1965, Ser. No. 512,955
Claims priority, application Great Britain, Dec. 11, 1964, 50,450/64
Int. Cl. G08c 5/00
U.S. Cl. 340—347                                    5 Claims

ABSTRACT OF THE DISCLOSURE

A digital shaft position indicator arrangement suitable for use with a resolver wherein a substantially linear voltage shaft angle ratio is produced by suitably combining the sine and cosine outputs from the resolver to produce a linear ratio which is converted to a digital signal by an analogue to digital converter.

---

Figure 1:
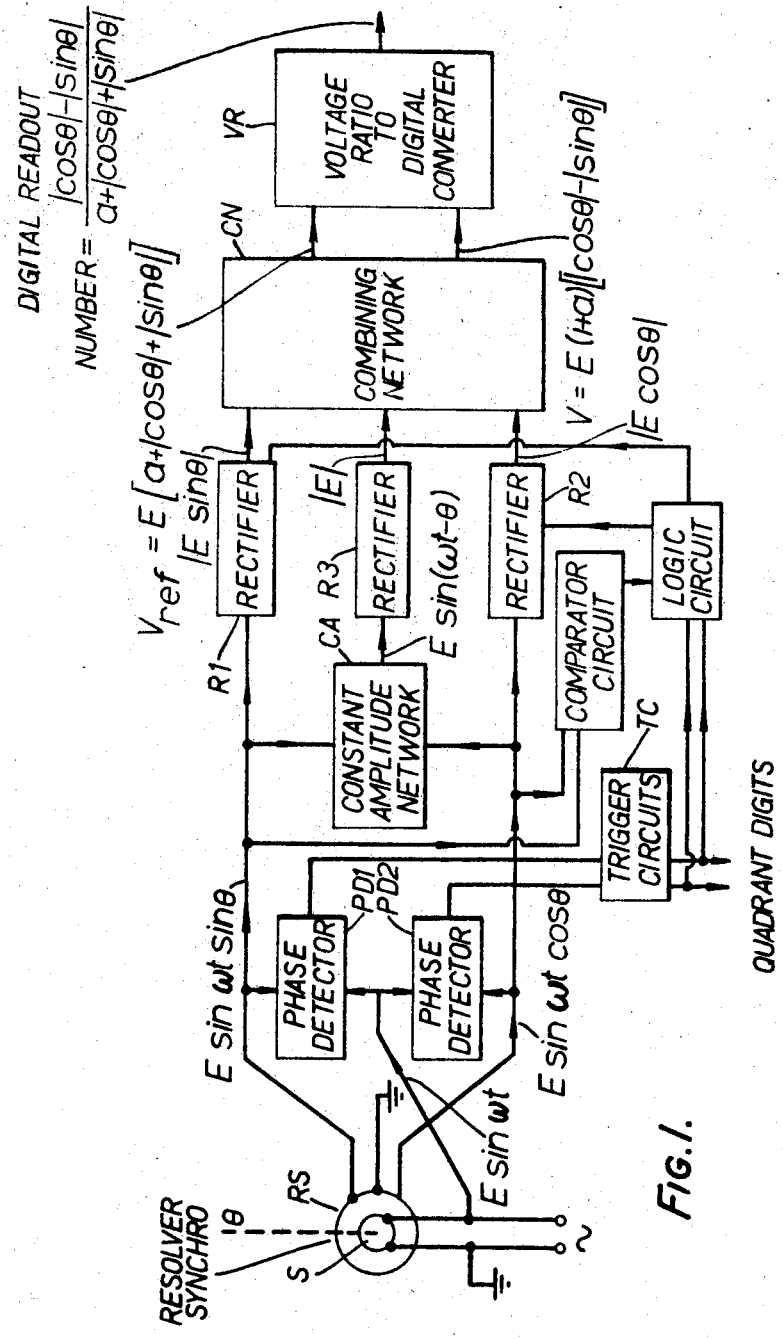

This invention relates to circuit arrangements for indicating the instantaneous shaft position of synchros or other devices which generate a plurality of sinusodially-varying alternating voltages which vary with shaft angle.

The present invention has in view the provision of an arrangement as aforesaid for affording a digital indication of instantaneous shaft angle.

According to the present invention such an arrangement for affording a digital output indication of shaft position comprises means responsive to the alternating voltage outputs from the synchro or other device to afford a first digital output indicative of the particular quadrant containing the instantaneous shaft angle and means for deriving direct voltages from said alternating voltages the ratio between which varies linearly with said shaft angle and means for converting said ratio to a second digital output which in combination with said first digital output affords the digital output indication of shaft angle.

The means referred to for obtaining the first digital output signifying the quadrant containing the said shaft angle may comprise a pair of phase detector circuits to which a reference input is applied, conveniently from the input to the synchro or other device and which afford respective direct voltage outputs the polarities of which define in effect a one-out-of-four code identifying the quadrant in question. These direct voltage outputs may be fed into circuits for producing constant amplitude digit output signals corresponding in polarity to the outputs from the phase detector.

The means for deriving the aforesaid second digital output may include rectifying means to which the alternating voltages from the synchro or other device are applied for producing respective direct voltages which are combined with each other in a combining network to provide a first output voltage as well as being combined with a further input to provide a second output voltage which defines a reference output. These output voltages may be applied to a voltage ratio-to-digital converter to provide a digital output which is linearly proportional both to the ratio of the converted outputs and to the synchro shaft angle.

By way of example, the invention, as applied to a resolver synchro, that is to say, a synchro producing two alternating voltages in phase with each other and varying respectively as the sine and cosine of the shaft angle, will now be described with reference to the accompanying drawings. However, it is to be understood that digital shaft position indicating arrangements according to the present invention are equally applicable to such device as Magslips, Synchrotels and sine-cosine potentiometers, to mention just a few. In the case where the device (e.g. control synchro) produces more than two sinusoidally-varying voltages the outputs may first be converted to signals of the same type as those derived from resolver synchros, as for example by the use of a so-called Scott-connected transformer.

Figure 2:
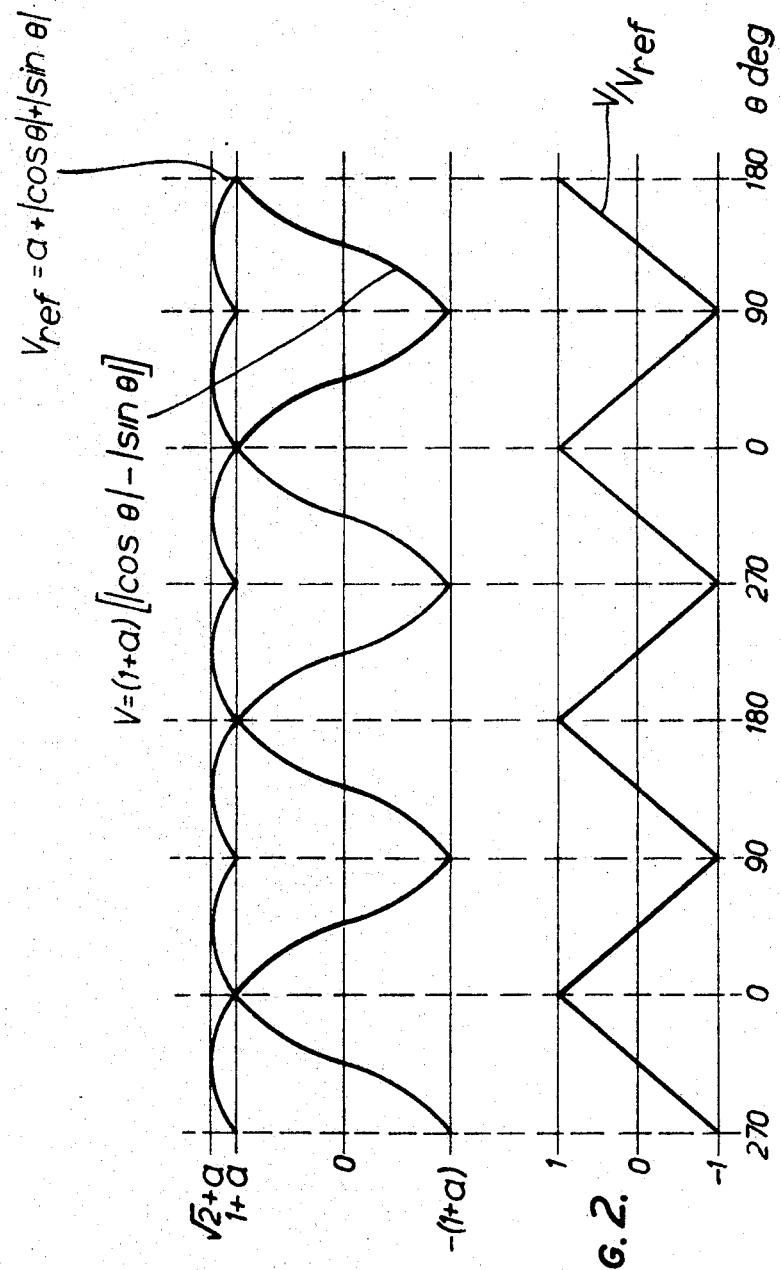

The accompanying drawings show in FIGURE 1 a block schematic diagram of a digital shaft angle indicating arrangement according to the invention applied to a resolver synchro while FIGURE 2 is a diagram showing waveforms of inputs to a ratio-to-digital converter of the arrangement of FIGURE 1, and of the ratio between such inputs.

Referring to FIGURE 1 of the drawings, a resolver synchro RS provides two alternating voltage outputs which vary with the sine and cosine, respectively, of the angle of the synchro shaft S. These outputs from the synchro RS are fed to respective phase detectors PD1 and PD2 of well known form to which is fed as a reference input the synchro excitation. The phase detectors PD1 and PD2 provide direct current outputs the polarities of which change with synchro shaft angle in the manner indicated in the following table.

| Shaft angles, degrees | Polarity of output from PD2 | Polarity of output from PD |
|---|---|---|
| 0 to 90 | +ve | +ve |
| 90 to 180 | −ve | +ve |
| 180 to 270 | −ve | −ve |
| 270 to 360 | +ve | −ve |

The outputs from the phase detectors PD1 and PD2 are fed to a pair of conventional bi-stable trigger circuits TC to produce two output voltages of constant amplitude having polarities corresponding to the detector outputs. These outputs taken in combination serve for providing a one-out-of-four code denoting the quadrant containing the shaft angle and are used to provide the first two digits of a composite digital output indication of shaft angle.

The two outputs from the synchro RS are also fed into respective rectifiers R1 and R2 which produce direct current voltages proportional to the quantities $E/\sin \theta/$ and $E/\cos \theta/$, where E is proportional to the excitation voltage applied to the synchro rotor and $\theta$ is the synchro shaft angle. These voltages are then combined in a combining network CN to form an output given by $V = E(1+a)(/\cos \theta/ - /\sin \theta/)$, where $a$ is a constant. Said combining network can be of any of the known arrangements adapted to perform the additive and subtractive functions required, for example, D.C. summation amplifiers having a plurality of inputs to which the pertinent signals are applied. Such summation amplifiers produce a single output which is the algebraic sum of said inputs, although with a change of sign. Subtractive functions are produced by connecting two of such summation amplifiers in series, with the output of the first amplifier providing an input to the second amplifier. The first amplifier provides the change of sign necessary for the performance of the subtractive function by the algebraic addition in the second amplifier. Reference is had to British Patent No. 1,072,271 of the assignee herein which, although more particularly concerned with telegraph systems, shows combining networks suitable for additive and subtractive functions utilizing summation amplifiers.

The outputs of the rectifiers R1 and R2 are additionally combined with a substantially constant amplitude signal E, also proportional to the excitation voltage applied to the synchro RS and derived from a constant amplitude network CA via a rectifier R3, so as to produce a further voltage given by $Vref = E(a+/\cos \theta/+/\sin \theta/)$.

These two voltages V and Vref and their ratio are shown in FIGURE 2 where it can be seen that adjustment of the constant $a$ can make the ratio between the two voltages vary with shaft angle $\theta$ in a substantially linear manner. By appropriate choice of the constant $a$ any deviation from linearity can be made less than one minute in any quadrant. The voltages V and Vref are accordingly fed to a voltage ratio-to-digital convertor VR of any convenient form to produce a binary number proportional to the voltage ratio $V/Vref$ and the combination of the digital output from convertor VR with the digital output from the trigger circuits TC will give a composite digital indication of synchro shaft angle.

Considering the operation of the various components of FIGURE 1 in more detail, the rectification of the sine and cosine outputs from the synchro RS could be achieved by diodes but with the output levels normally encountered the voltage drops across the diodes would tend to be excessive. Consequently, switching transistors may therefore be employed as a synchronous rectifier for the rectifiers R1 and R2. The reference switching signals for the synchronous rectifier could be obtained from the synchro outputs with a comparator circuit selecting whichever of the two inputs has the largest amplitude and a logic circuit operated by the quadrant digits from the trigger circuits TC feeding the selected signal to the synchronous rectifiers either directly or inverted according to the particular quadrant containing the shaft angle. In this manner two signals are obtained which, irrespective of the synchro shaft angle, have amplitudes and phase angles the same as those of the inputs to the rectifiers R1 and R2 and are therefore suitable for operating the synchronous rectifiers. If synchronous rectification is not used, then comparator and logic circuits are obviously not required.

As shown in FIGURE 1, the constant amplitude signal is obtained by feeding the outputs from the synchro RS into a phase shifting constant amplitude network CA which provides an output having variable phase and amplitude independent of synchro shaft angle. This constant amplitude signal is then rectified by the rectifier R3 to produce the desired constant amplitude reference voltage. Alternatively, the constant amplitude signal could be obtained by operating directly on the outputs from the rectifiers R1 and R2, as for example by feeding the output of each rectifier to a squaring circuit and then adding the outputs of the two circuits.

From the foregoing it will be appreciated that the arrangement for providing a digital output indication of shaft angle according to the present invention can provide an accurate indication over the full 360° range of shaft angle. The constant amplitude network CA, for producing said signal, may include a conventional 90° phase shift network to which the function $E \sin \omega t \sin \theta$ is applied from the synchro RS to produce a resultant voltage $E \cosine \omega t \sin \theta$. Said resultant voltage would then be added to the other function of the synchro RS, namely $E \sin \omega t \cosine \theta$ by a conventional adding circuit to produce the function $E \sin (\omega t - \theta)$, which is a constant. Although phase shift may occur, this has negligible effect on the output from the digital indicator since it only affects the operation of the phase detectors PD1 and PD2 from which the quadrant digits are derived, and such phase shift has through the synchro to be very large before errors can be produced in these "coarse" digits.

Frequency and amplitude variations of the synchro excitation also produce negligible errors. To the extent that the rectifiers R1 and R2 are truly linear, the ratio between the voltages V and Vref is independent of amplitude, and frequency variations can at most affect the amplitude of the constant amplitude reference voltage, changes in which will have a second order effect on the output of the arrangement. Moreover, harmonic and quadrature components in the synchro outputs have negligible effect on the digital output since provided the input signals to the rectifiers R1, R2 and R3 all have the same waveform then the ratio between the rectifier outputs is independent of waveform distortion.

It is also an advantage of the arrangement that it can readily be made self checking. To this end a threshold circuit may be connected to the Vref output, and arranged to operate an alarm whenever the input to it deviates more than say plus or minus 30% from its nominal value. Any failure of the circuit or its inputs will cause the alarm to operate.

What I claim is:

1. An arrangement for producing a digital output indication of shaft angle of a device in respect of which a pair of voltages in relative phase quadrature and varying cyclically with shaft angle are provided comprising means for providing a first digital output indicative of a particular angular sector in which said shaft angle is contained; means for combining said pair of voltages additively to produce a first voltage which varies proportionately to the modulus of the sum of the voltages of the pair and for combining said pair of voltages differentially to produce a second voltage which varies with the modulus of their difference; and means for producing a digital signal corresponding to the ratio between said first and said second voltage, which ratio is indicative of the phase angle within the said sector.

2. An arrangement for producing a digital output indication of shaft angle $\theta$ of a device in respect of which a pair of voltages are provided the amplitude of which varies with $\sin \theta$ and $\cos \theta$ respectively comprising, means for providing a first digital output indicative of a particular angular quadrant in which said shaft angle $\theta$ is contained; means for combining said pair of voltages additively to produce a first voltage which varies proportionately to $\cos \theta + \sin \theta$ and for combining said pair differentially to produce a second voltage which varies with $\cos \theta - \sin \theta$ and means for producing a digital signal substantially proportionate to the ratio of said first voltage to said second voltage, which ratio varies substantially linearly with shaft angle $\theta$.

3. An arrangement as claimed in claim 2, wherein said device provides two similar alternating voltages the amplitude of which varies respectively with $\sin \theta$ and $\cos \theta$ said arrangement including first and second rectifying means to which the two alternating voltages respectively are applied to provide at the output thereof said pair of voltages one from each of said rectifier means.

4. An arrangement as claimed in claim 3, including a constant amplitude network to which the two similar alternating voltages respectively represented by $E \sin \omega t \sin \theta$ and $E \sin \omega t \cos \theta$ are applied to produce at the output of the said network a resultant voltage $E \sin (\omega t - \theta)$ the amplitude of which is constant with variation of $\theta$; third rectifying means to which said resultant voltage is applied; means for combining the output from the third rectifier means additively with said first voltage thereby to modify it and for combining said second voltage with a suitably selected constant voltage thereby to modify it and means for providing in respect of the ratio of said first and second voltages thus modified a digital signal indicative of the angle within the said quadrant.

5. An arrangement as claimed in claim 4, wherein the device is a resolver synchro.

References Cited

UNITED STATES PATENTS

| | | | |
|---|---|---|---|
| 3,295,125 | 12/1966 | Idelsohn et al. | 340—347 |
| 2,984,831 | 5/1961 | Oken et al. | 340—347 |
| 3,023,959 | 3/1962 | Rabin et al. | 340—347 |
| 3,045,230 | 7/1962 | Tripp et al. | 340—347 |
| 3,071,324 | 1/1963 | Schroeder et al. | 340—347 |
| 3,205,492 | 9/1965 | Young et al. | 340—347 |
| 3,335,417 | 8/1967 | Adler et al. | 340—347 |

MAYNARD R. WILBUR, Primary Examiner

C. D. MILLER, Assistant Examiner

U.S. Cl. X.R.

235—186